United States Patent
Mattes

[19]

[11] Patent Number: 6,038,295
[45] Date of Patent: Mar. 14, 2000

[54] APPARATUS AND METHOD FOR RECORDING, COMMUNICATING AND ADMINISTERING DIGITAL IMAGES

[75] Inventor: Heinz Mattes, Munich, Germany

[73] Assignee: Siemens Aktiengesellschaft, Munich, Germany

[21] Appl. No.: 08/877,488

[22] Filed: Jun. 17, 1997

[30] Foreign Application Priority Data

Jun. 17, 1996 [DE] Germany ............................ 196 24 128

[51] Int. Cl.$^7$ .................................................. H04M 11/00
[52] U.S. Cl. ........................ 379/93.25; 348/211; 704/270
[58] Field of Search ................................ 348/14–17, 211, 348/223, 232, 231, 7, 239, 522; 455/418–420; 379/88–89, 93.21, 93.25; 707/3–5, 10; 395/2.66; 704/270; 396/283

[56] References Cited

U.S. PATENT DOCUMENTS

| | | | |
|---|---|---|---|
| 5,063,587 | 11/1991 | Semasa et al. ............................ | 379/53 |
| 5,182,765 | 1/1993 | Ishii et al. ................................ | 379/88 |
| 5,260,989 | 11/1993 | Jenness et al. ............................ | 379/59 |
| 5,576,759 | 11/1996 | Kawamura et al. .................... | 348/231 |
| 5,594,736 | 1/1997 | Tatsumi et al. ......................... | 348/232 |
| 5,633,678 | 5/1997 | Parulski et al. ......................... | 348/231 |
| 5,640,198 | 6/1997 | Makiyama et al. ...................... | 348/17 |
| 5,666,159 | 9/1997 | Parulski et al. ......................... | 348/211 |
| 5,689,303 | 11/1997 | Kuroiwa ................................. | 348/232 |
| 5,721,827 | 2/1998 | Logan et al. ............................ | 348/13 |
| 5,737,491 | 4/1998 | Allen et al. ............................. | 348/211 |
| 5,737,592 | 4/1998 | Nguyen et al. ............................ | 707/4 |
| 5,748,841 | 5/1998 | Morin et al. ........................... | 395/2.66 |
| 5,748,898 | 5/1998 | Ueda .......................................... | 348/7 |

FOREIGN PATENT DOCUMENTS

| | | | |
|---|---|---|---|
| 0 624 968 | 11/1994 | European Pat. Off. | ........ H04M 11/06 |
| 0 702 490 | 3/1996 | European Pat. Off. | ......... H04N 7/14 |
| 41 26 105 | 2/1993 | Germany | ...................... H04M 11/00 |
| 44 08 738 | 9/1995 | Germany | ...................... H04M 11/00 |
| 195 42 122 | 5/1996 | Germany | ........................ H04M 3/42 |
| 44 41 685 | 6/1996 | Germany | ...................... H04M 11/00 |
| 6 268582 | 9/1994 | Japan | ............................ H04N 5/225 |

OTHER PUBLICATIONS

Japanese Abstract, vol. 15, No. 351, 3–136487, Jun. 11, 1991.

Marktübersich: Low–cost–Digitalkameras, Canon: Power-Shot 600, MACup Apr. 1996, pp. 100–101.

*Primary Examiner*—Paul Loomis
*Assistant Examiner*—George Eng
*Attorney, Agent, or Firm*—Hill & Simpson

[57] ABSTRACT

A communication system includes at least one telephone unit, a transmission system for communicating from the telephone unit, and a server for receiving information via the transmission system. The telephone unit includes a digital image pick up by which images are recorded, transmitted to the server, and stored in the server depending upon classification information which characterizes the digital images and which is associated with the digital image data. The classification information is determined by an analysis unit in the server.

26 Claims, 4 Drawing Sheets

APPARATUS AND METHOD FOR RECORDING, COMMUNICATING AND ADMINISTERING DIGITAL IMAGES

BACKGROUND OF THE INVENTION

1. Field of the Invention

The present invention relates generally to an apparatus for recording of a digital image, communicating the digital image from the recording device to a storage device, and to administering the digital image in the storage device. The present invention also relates to a method for recording, communicating and administering the digital image.

2. Description of the Related Art

In the field of telecommunications, data of a wide variety of data types is transmitted from a sender to a receiver, either unidirectionally or bidirectionally. The data which is transmitted may be, for example, voice signals, image signals, or written characters which have been converted into digital signals. Video conferencing systems are used to transmit spoken data in combination with image data and/or written character data. These systems share the operation of various applications. Video conferencing systems require a high performance, expensive and bulky computer with an external video camera at both the sender end as well as at the receiver end.

Digital image cameras are currently available on the market, as known, for example, from the publication "Market Over View: Low-Cost Digital Cameras, Canon: Powershot 600", MACup, pages 100–101, No. 4, 1996.

So called cellular telephones may be utilized for image transmission, as is known, for example, from the U.S. Pat. No. 5,260,989, entitled "Method and System for Enhanced Data Transmission in a Cellular Telephone System".

An arrangement with a television camera and a telephone which provides for audio data and image data to be transmitted in common through a telephone line is known, for example, from the U.S. Pat. No. 5,063,587 entitled "Transmission System for Still-Picture T.V. Telephone". The disclosed apparatus makes it possible to digitize, compress and transmit individual still pictures, such as photographs.

When a large number of digital images are recorded and are to be archived in a central computer unit, then the organization of the data base becomes a problem. In particular, the problems of locating the data of an image data file increase as the number of images to be archived increases.

A book by S. Naumann et al. entitled "Parsing", Teubner Verlag, Stuttgart, 1$^{st}$ Edition, ISBN 3-519-02139-0, pages 155–166, 1994 discloses devices referred to as parsers.

An image and audio communication system having a graphical annotation capability is disclosed in the European Patent document EP 0 64 968 A2 in which voice, data and image communications are used in telephone systems. The circuit arrangement provides that still pictures and/or moving pictures can be recorded during a voice and data communication on a picture screen of a PC (personal computer) in parallel to the data displayed on the screen.

SUMMARY OF THE INVENTION

The present invention addresses the problem of a communicating and administering digital images by providing for recording, administration and archiving of digital images simply, fast and in such way that the information therefor may be easily tracked. Furthermore, the present invention simplifies transmission of digital images which have been recorded, optimizes the communication of the image data and provides a method for administering the storage of the digital images, which is simple, fast and surveyable so that the digital images may be archived.

These problems are solved by a communication system for recording and administering the digital images which includes at least one telephone unit that in addition to a telephone function has a digital image pick up unit for recording images, a telephone memory for storing the digital images, and a processor for processing the digital images. The telephone unit may associate classification information with the digital images. A transmission system is coupled to the telephone unit and to a server for transmitting of the data which includes the digital images and potentially the classification information from the telephone unit to the server. The server has a receiving unit for receiving the data sent by the telephone unit, and an analysis unit for analyzing the data with respect to the classification information which characterize the digital images, and a memory in which the digital images may be archived, taking into consideration the classification information during the archiving step. Specifically, the communication system has at least one telephone unit, a server and a transmission system for transmitting the data from the telephone unit to the server. The telephone unit has a telephone portion and at least one digital image recorder which has the function of a digital camera, a telephone unit memory for storing the digital images taken by the digital camera and a data processor for processing the digital image data. The server includes a reception unit, an analysis unit which analyzes the data that is sent from the telephone unit with respect to classification information, also referred to as order features, as well as a memory for storing the digital images. The order features, or classification information, characterize the digital images and are taken into consideration as the images are stored.

As the method of the present invention, the digital images are recorded and administered by, first, recording the images by a digital image pick up unit which is included in the telephone unit, converting the images to digital form as digital images and possibly stored, transmitting data which contains the digital images as well as classification information which characterize the digital images to a server, receiving the data in the server, extracting the classification information from the data, and storing the digital images in the server taking into consideration the classification information during the storing step.

The communication system of the present invention exhibits a number of advantages. The present communication system can transmit speech as in a standard telephone system using the telephone unit and can additionally transmit still picture, in other words photographs, over this same communication system. The telephone unit which records the digital images in the digital image pickup also transmits the data which contains these digital images using the telephone functions. Addition data may be transmitted with the digital image data as well. Classification information which is found in the transmitted data is extracted in the analysis unit and are used for storing the digital images in such a way that they can be easily relocated, even when a great number of digital images are stored and administered. In this way, it is possible to implement an automated archiving of digital images in the server. Since the storing step depends upon the extracted classification information that characterize the individual digital images, a simple, fast and surveyable archiving of the digital images is automatically carried out.

According to the present method, the images are acquired and stored in digital form as digital images. Data is transmitted from the telephone unit to the server, the data containing at least the digital images. The classification information which characterize the digital images is extracted in the server and the digital images is stored in the server taking into consideration the classification information.

In a development of the present invention, the telephone unit is a wireless telephone which wirelessly transmits the data over the transmission system. In other words, the telephone is a mobile telephone unit, which makes it possible to immediately register the image and voice information and to have this information available at any arbitrary location. It is, thus, possible to distribute image and voice information over the mobile telephone quickly and possibly to distribute it to multiplied locations.

It is within the framework of the present invention that the user may provide the classification information which is allocated to the digital images and which identify the digital images. The communication system of the present invention provides a means for allocating this classification information as prescribed by the user of the present device to the digital images. The communication system provides that additional information about the recorded image may be attached at the time of the image acquisition directly by the individual implementing the recording of the image. This avoids additional information editing which may potentially be required for the digital images at the server end. Another advantage is that the individual who records the image probably best understands the information which describes the image and can easily allocate that description to the image data.

As a further development of the communication system, a speech recognition unit is provided in the telephone unit. The recognized speech data can be easily transmitted with the image data since the compression rate for recognized speech data (which is in the form of text) is greater than for the audio information.

According to the various embodiments of the present communication system, the classification information may have different embodiments containing different information. It is advantageous in one development of the invention that the classification information includes audio data. The archiving of such data is very simple and user friendly since the user merely has to speak the information describing the recorded image into the telephone unit as in a telephone conversation. In addition to speech, the audio data included with the image data may provide other classification information for the image. For example, it is envisioned that specific sounds or noises which characterize the image data or freely selectable music passages be included as classification information in the transmitted data. The classification information may contain at least the time and/or time of day at which the image was recorded or at which the image data was transmitted to the server. As a result, the classification information may be extracted in a very simple way in the server and can be directly converted into information about the location in the memory at which the digital image should be stored. By converting the time and date information into a form usable by the server, the received digital images may be stored in lists or directories in the server which are classified according to the time at which the image was acquired or the time of the transmission of the digital image, which information is transmitted along with the digital image to the server or obtained upon transmission.

As a further development, the classification information may contain at least the telephone number of the telephone unit and/or the telephone number of the server in the data accompanying the digital image. This permits the particular telephone unit or server to be identified by the classification information included with the digital image.

The classification information, according to an advantageous development, may directly contain particular information about the location in the server memory where the digital images should be stored. For example, a direct path indication of the directory in the server in which the digital image is stored may be included as the particular information accompanying the digital image. This simplifies the analysis of the classification information so that the method of the present invention can be implemented considerably faster and the communication system can be realized with less outlay for hardware.

A data bank system may be provided as a server in the present communication system in a preferred embodiment.

It is advantageous to provide an image analysis unit in the server to determine the quality of the digital images so that the relationship between the required image quality and the data transmission rate in the transmission system may be improved. When the image quality which is required is higher than the image quality which is supplied, then a higher image resolution for the digital images may be requested by the server from the telephone unit according to yet another development of the present invention. When, on other hand the image quality transmitted by the telephone unit is higher than that required in the server, then a lower data transmission rate can be set and a lower image quality can be requested from the telephone unit. Thus, the present communication system may include a control unit in the server for controlling the resolution of the digital images in the telephone unit and/or for controlling the transmission rate of the data to be used in the transmission system. The transmission rate and the costs for the transmission of the digital images can thereby be reduced.

Further, features of the present invention provide for a speech analysis unit for analyzing parts of speech and a extracting therefrom information for the classifying information to be included with the image signals. In another development, the server may include a speech synthesis unit for generating speech signals to transmit to the telephone unit. It is contemplated that the telephone unit may be connected to the server via the internet.

DETAILED DESCRIPTION OF THE PREFERRED EMBODIMENTS

Figure 1:
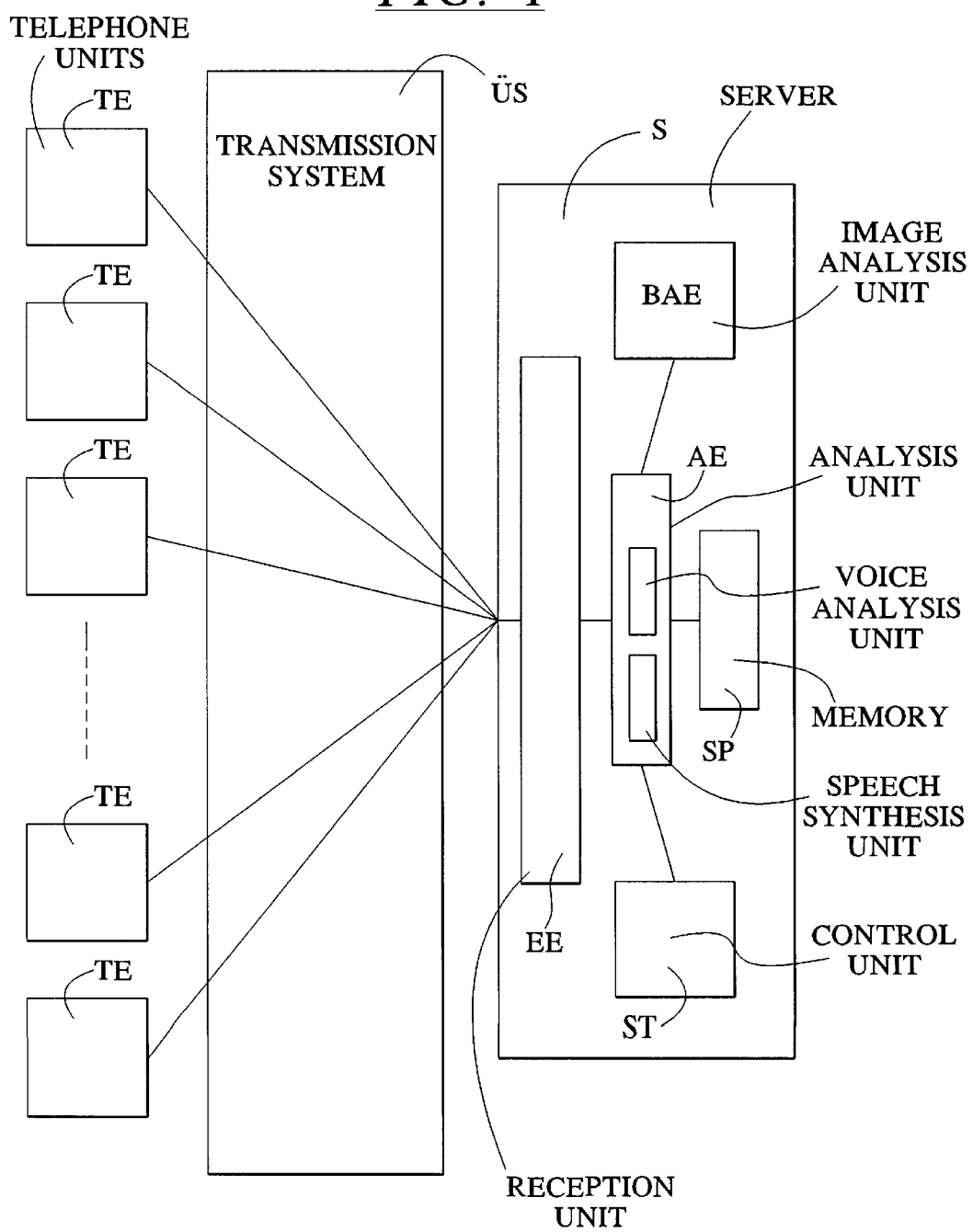
FIG. 1 is a block diagram of a communication system including a plurality of telephone units according to the principles of the present invention.

The communication system according to the present invention as shown in FIG. 1 including as components an arbitrary number of telephone units TE, a server S, and a transmission system US that is coupled to the telephone units TE as well as to the server S and that is used for transmitting data between the telephone units TE and the server S.

The server S is a computer system which serves for organizing a database which includes a large number of digital images as well as classification information OM which may potentially be allocated to the digital images. The server S includes at least the following components, an receiving unit EE for receiving the data that is sent from the telephone unit TE via the transmission system US and an analysis unit AE that is coupled to the receiving unit EE and which extracts the classification information from data received by the server S. Various possible embodiments for the analysis unit AE will be described later. In addition, a memory SP for storing the data as well as the digital images which is contained in the data is provided in the server S.

In one embodiment, the servers includes an image analysis unit BAE which determines the quality of the digital image that is provided to the server S. For example, the noise level within the digital image is determined by the image analysis unit BAE and the quality of the image is estimated depending upon the amount of noise which is detected.

In addition, a control unit ST is provided in the server S in one embodiment of the communication system. The control unit ST controls the image resolution of the digital images using the image compression in the telephone unit, for example. In particular, image compression methods utilize a control parameter to set the image compression level for the digital images such as the quantizing factor in a JPEG (joint photographic expert group) image date compression. The control unit ST determines this quantizing factor to be used to obtain the desired image quality.

The control unit ST also controls the transmission rate during transmission of the data via the transmission system US.

Further developments of the present communication system provide for including a means for analysis of voice signals which are spoken into the telephone unit TE, from which the classification information OM may be extracted. In a preferred development, this voice analysis means is provided in the image analysis unit BAE. It is also contemplated in the present invention to provide a speech synthesis unit in the server S. The speech synthesis unit includes digitally stored voice information which is converted into speech which is then presented to a user of the present communication system as a natural language output.

The server S is configured with an arbitrary data bank system in which the digital images may be administered. The analysis unit AE provides the administering function, which will be described in greater detail here and after.

Figure 2:
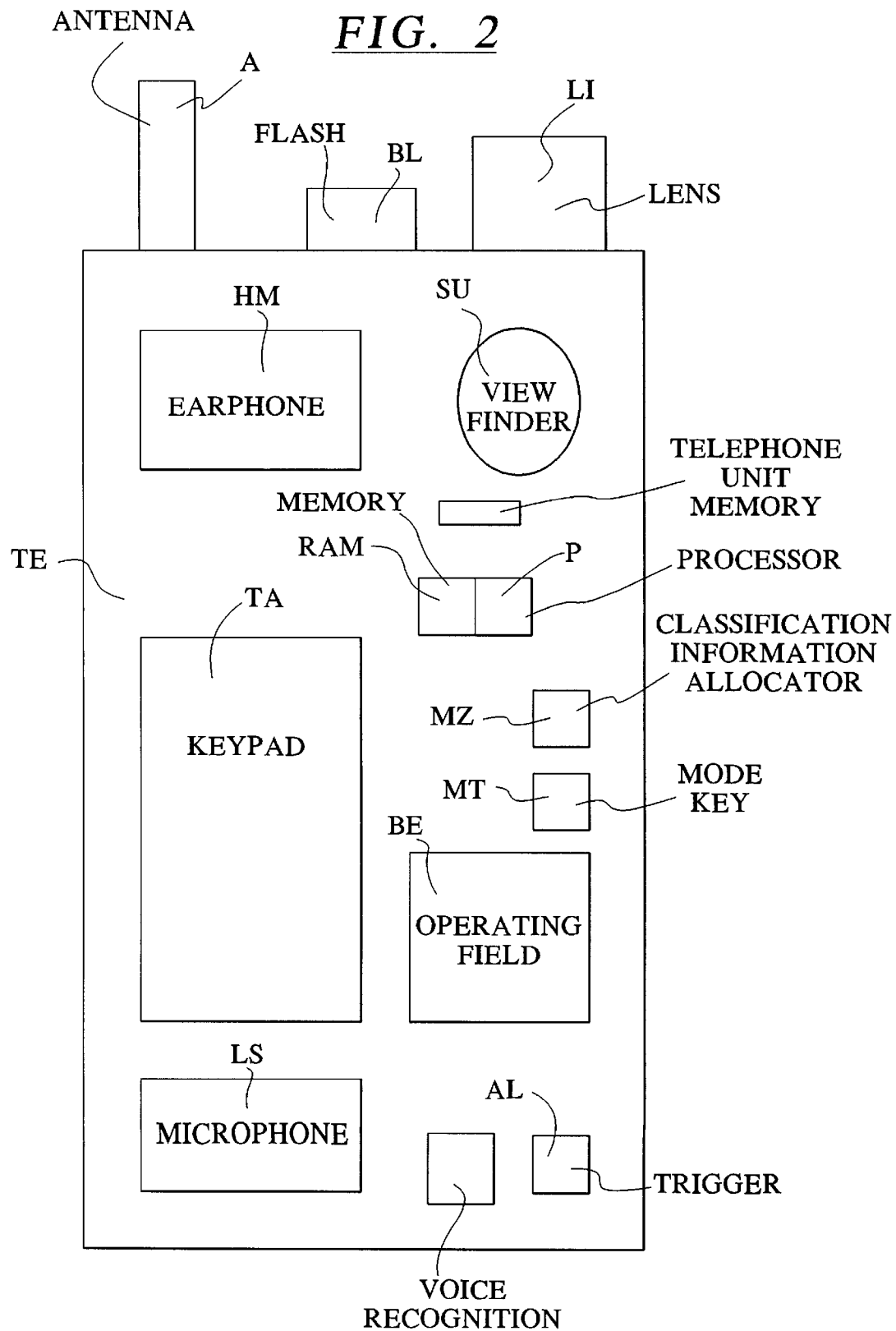
FIG. 2 is a plan view of a telephone unit to be used in the communication system of the present invention.

Although the present communication system is envisioned as including a plurality of telephone units TE, the communication system will be described hereinafter with reference to only a single telephone unit TE for simplicity and without limiting the scope of the present invention. The single telephone unit TE is shown in FIG. 2. The telephone unit includes the standard features of a telephone unit including, for example, an earphone HM, a keypad TA which serves as an operating field for the telephone unit TE, as well as a microphone LS. The telephone unit also includes a digital image pick up unit for recording images, the digital image pick up unit being integrated into the telephone unit TE. In FIG. 2, the telephone unit TE includes a lens LI and a view finder SU and may possibly include a photoflash BL.

As an alternative to an integrated image pick up unit and telephone unit, the image pick up unit may be spatially separated from the telephone unit but connected to one another via a connection such as a line connection, a plug-type connection or a radio link.

The digital image pick up unit operates as a digital photo camera of the type which is known. A telephone unit memory TS is provided for storing the images registered by the digital image pick up unit in digital form in the telephone unit TE. The digital images may be compressed using still picture image data compression methods such as JPEG. The compression method is implemented using a data processor P which includes a memory RAM. The data processor P serves for processing the digital images. However, the processor P can be used for other processing tasks as well including, for example, pattern recognition or voice recognition within the telephone unit TE.

The telephone unit TE can be used as a "normal telephone" to make calls or as an image recording device with its expanded functionality. It is provided, according to one development of the invention, to provide a mode key MT by which the operating mode of the telephone unit TE is switched such as between operation as a normal telephone or as an image pick up and transmitting unit according to the present communication system. When set to operate as an image pick up unit, a separate trigger, or shutter button, AL is provided for recording of the images by the image pick up unit.

The various functions provided by the present telephone unit TE may be controlled and/or displayed in an operating field BE. For instance, the operating field BE may be utilized in the allocation of speech spoken by the user to individual digital images. The telephone unit thus temporarily functions as a "dictating machine", with control via the operating field BE. While the various controls such as the mode key MT, the shutter AL and the operating field BE are shown as separate controls, they need not be fashioned as separate keys but may be integrated in terms of their various functions into the keypad TA for the telephone unit TE by using key combinations.

The present telephone unit may be operated via a telephone line or may alternately be operated wirelessly as a mobile telephone using an antenna A for transmission and reception of data. Thus, the telephone unit TE is fashioned as a mobile telephone (a so called cellular phone) or as a cordless telephone.

Figure 4:
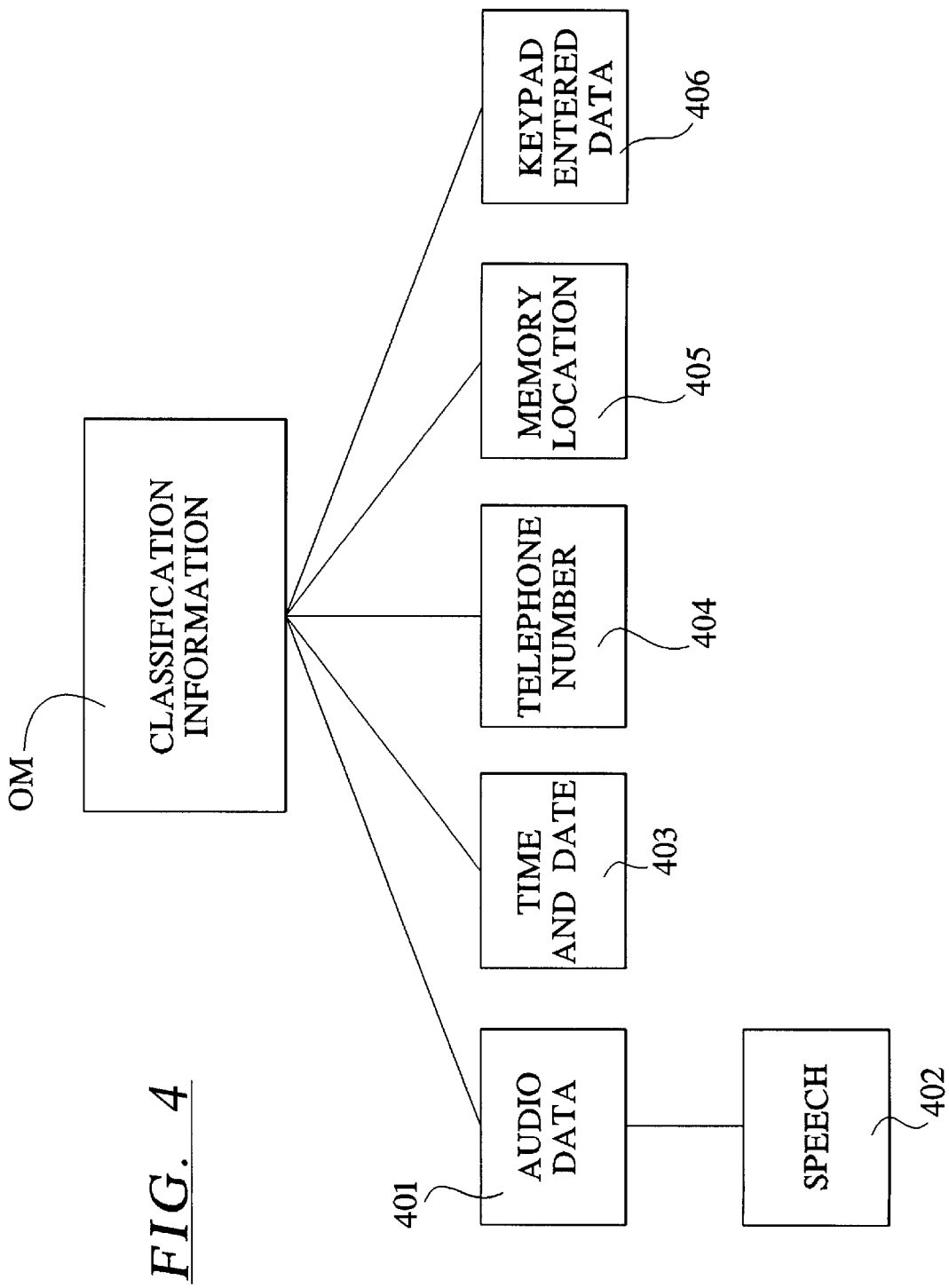
FIG. 4 is a block diagram showing various classification information, or order features, which may be associated with the image data according to the present invention.

In the illustrated embodiment, a means MZ is provided in the telephone unit TE for allocating the classification information OM which are prescribed by the user to the digital images and thus characterizing the digital images. In terms of its function, the allocation means MZ may be integrated into the keypad TA, for example, by using key combinations. The telephone unit TE also includes a speech recognition unit which converts open speech into text. The text can then be allocated to the digital images and transferred with the digital image data. Referring to FIG. 4, the various possibilities for the classification information OM are illustrated. The classification information OM which are unambiguously allocated to the digital images serve to characterize the digital images so that a surveyable, unambiguous storage of the digital images in the server S may be carried out in such a way that the digital images can be quickly relocated in their stored locations. The following classification information OM is not intended to be all inclusive but only as examples of information which may be included as classification information. The classification information OM may be implicitly contained in the digital image itself, such as being derived from the image content such as identifying a specific building in the photo, identifying a specific recorded landscape, or a specific recorded vehicle type. The analysis unit AE of the server serves to analyze the image content and record the image according to the meaning derived from the image analysis. When the classification information OM are implicitly contained in the digital image, then the analysis unit AE includes a pattern recognition unit which searches the image for specific, predetermined features in the digital image.

The classification information OM may also be included in the transmitted data as forwarded from the telephone unit TE to the server S with the digital images. Such information may be the address or the telephone number of the telephone unit TE which transmits the data. Furthermore, the time of recording of the respective digital image and/or the time of transmission of the digital image to the server may be provided as classification information for the image data. When this is the case, the analysis unit AE is fashioned such the this time and date, or address, or telephone number information can be extracted from the transmitted data. This information can be included as a header field provided with the transmitted message that contains the image data and, as such, analysis thereof is quite simple.

In a preferred embodiment, the classification information OM as shown in FIG. 4 include the following types of data:

- an arbitrary form of audio data 401 such as melodies, songs, noises, or speech 402 which is spoken into the telephone unit TE by the user;
- the time of day and/or the date of the recording of the image and/or the time of day and/or the date of the transmission of the data 403;
- the telephone number of the telephone unit TE which obtained and transmitted the image data and/or the telephone number of the server S 404 which received the data, or some other type of identification of the telephone unit TE and/or of the server S such as an unambiguous address for the telephone unit TE or for the server S;
- some particular information about the location in the memory at which the digital image should be stored 405. This may be an unambiguous path indication which indicates the location in memory or in the directory structure and the server S at which the respective digital image should be stored; and
- other alphanumeric data which may be input into the telephone unit TE via the key pad TA in, for example, an ASCII format 406.

The analysis unit AE is fashioned so that it may extract the classification information OM from the data received by the server S and, as such, it is fashioned in accordance with the expected classification information OM. Various realizations of the analysis unit AE may be utilized including in a type of parser with which the respective information is extracted. A parser may be of the type which is known.

The classification information OM which are transmitted with the digital image or which are allocated to the digital image are used for archiving the images in the server memory.

Figure 3:
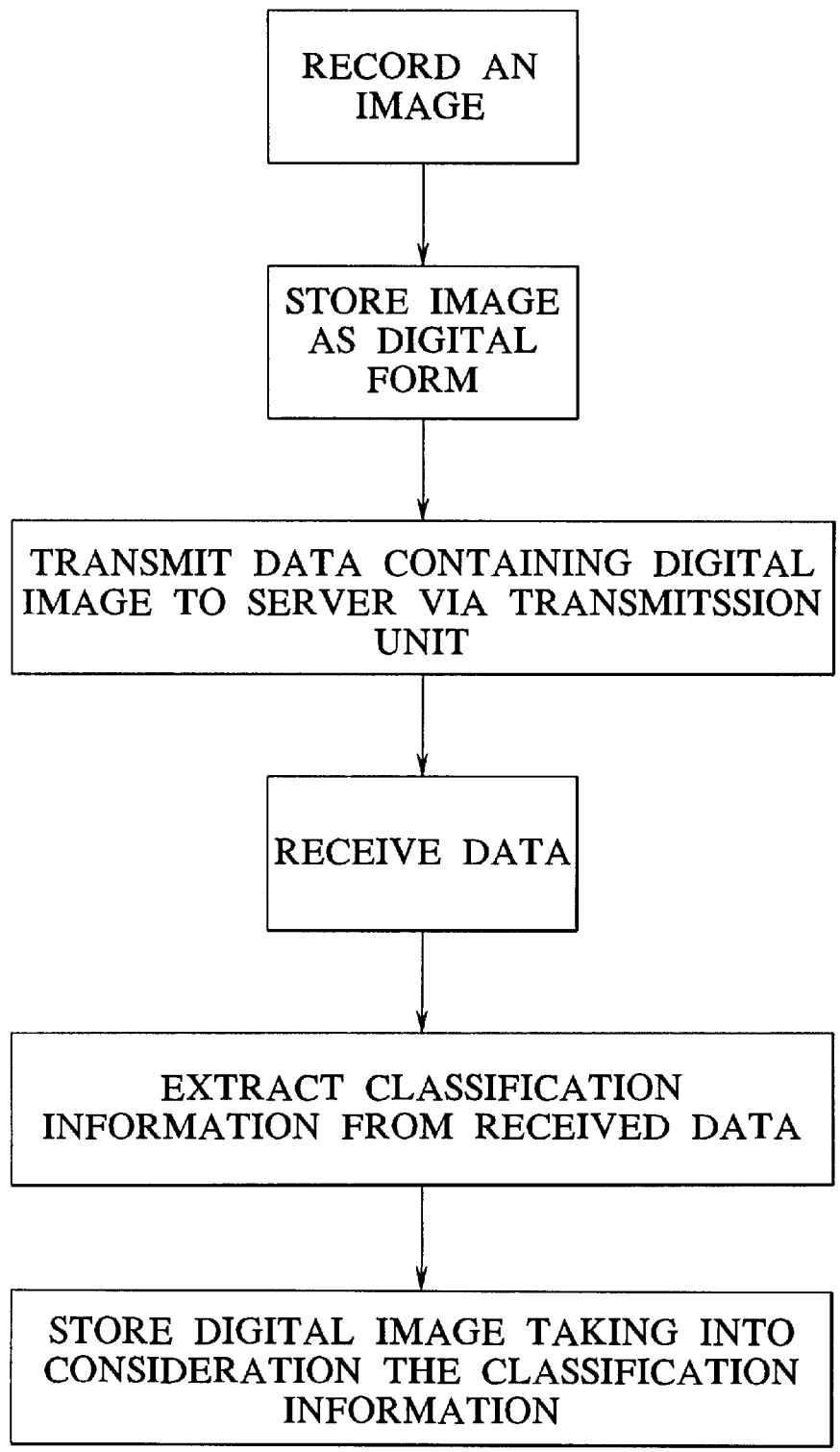
FIG. 3 is a flow chart illustrating the method steps according to the method of the present invention.

A method according to the present invention is illustrated in FIG. 3, including a first step 301 in which images are recorded with the digital image pick up unit that is integrated into the telephone unit TE. According to the step 302, the images are stored in digital form in the telephone unit memory TS as digital images. The images are transmitted in step 303, either in compressed form or non-compressed form, from the telephone unit TE to the server S via the transmission system US. The data is received at step 304 at the server S and the classification information OM which characterize the digital images are extracted at step 305 from the data received in the server. The digital images and possibly the classification information OM and potentially further information that characterize or described the digital images are stored at step 306 in the server. During the storing step, the classification information OM is taken into consideration.

The classification information OM may be prescribed by a user of the telephone unit TE, for example, by simply speaking the information into the microphone LS of the telephone unit TE or by inputting a character sequence into the key pad TA.

As a development of the method, the spoken language by the user may be recognized and stored in a compressed form, for example, as text. This achieves a further reduction in the transmission rate for the digital image with accompanying classification information. Also included in a development according to the present invention is the identification of the quality of the image and the control of the required or available transmission rate in the transmission system US by which the data is transmitted, the controlled being dependent upon the quality of the image desired. When the quality of the image is classified as too low in the server, a re-transmission of the digital images requested from the telephone unit with the newly transmitted image exhibiting a higher quality or high resolution.

To determine the quality of the image, the noise in the digital image is estimated using, for example, the image analysis unit BAE. The noise in the image serves as a criterion for estimating the quality of the image.

It is a particular advantage to utilize the present invention in conjunction with the connection to the Internet. For example, the images may be automatically stored or archived on the basis of the classification information OM in either a public or private mailbox on the Internet. The recorded images may be forwarded to a server via the Internet or may be directly displayed on a page of the World Wide Web.

Thus, there is shown and described a telephone unit which is either a wire transmitting telephone or a cordless phone and possibly in a cellular phone which incorporates therein a digital camera so that photographic images may be obtained by the digital camera portion and transmitted via the telephone portion. The transmitted digital images are preferably compressed and are preferably provided with classification information during the transmission so that the server receiving the images can identify and store the images in a manner so that they are easily retrieved.

Although other modifications and changes may be suggested by those skilled in the art, it is the intention of the inventor to embody within the patent warranted hereon all changes and modifications as reasonably and properly come within the scope of his contribution to the art.

I claim:

1. A communication system for recording and administering digital images, comprising:
    at least one telephone unit including:
        a telephone portion for making telephone call,
        a digital pick up unit for recording images,
        a memory for storing digital images recorded by the digital image pick up unit,
        means for allocating classification information prescribed by a user of said at least one telephone unit to characterize digital images obtained by said digital pick up unit,
        a processor for processing the digital images recorded by the digital image pick up unit;
    a server including the following components:
        a receiving unit for receiving data sent from said at least one telephone unit, an analysis unit for analyzing the data received by the receiving unit from the telephone unit, the data including classification information to characterize the digital images, a memory in which at least the digital images are archived, the archiving taken into consideration the classifying information; and a transmission system coupled to said at least one telephone unit and to the said server to provide for transmission of data from said at least one telephone unit and to the said server, the data including at least the digital images recorded by the digital image pick up unit and classification information.

2. A communication system as claimed in claim 1, wherein said transmission system is wirelessly coupled to said at least one telephone unit.

3. A communication system as claimed in claim 1, wherein said at least one telephone unit further comprises a speech recognition unit.

4. A communication system as claimed in claim 1, wherein said at least one telephone unit further comprises means for incorporating audio data as the classification information.

5. A communication system as claimed in claim 4, wherein the audio data is language spoken into said at least one telephone unit, said at least one telephone unit including means for including spoken language as the classification information.

6. A communication system as claimed in claim 1, wherein said communication system includes a means for incorporating time information of image recording and/or image transmission of image data as the classification information.

7. A communication system as claimed in claim 1, wherein said classification information includes at least a telephone number of said at least one telephone unit and/or a telephone number of said server.

8. A communication system as claimed in claim 1, wherein said classification information includes particular location information in memory at which the digital images are to be stored.

9. A communication system as claimed in claim 1, wherein said server includes a data bank system.

10. A communication system as claimed in claim 1, wherein said server includes an image analysis unit for determining quality of the digital images.

11. A communication system as claimed in claim 1, wherein said server includes a control unit for controlling resolution of digital images in said at least one telephone unit.

12. A communication system as claimed in claim 1, wherein said analysis unit includes means for analyzing speech signals, said speech signals being provided as portions of the classification information.

13. A communication system as claimed in claim 1, wherein said server includes a speech synthesis unit.

14. A communication system as claimed in claim 1, wherein said server is connected to the said at least one telephone unit via the Internet.

15. A communication system as claimed in claim 1, wherein said server includes a control unit for controlling a transmission rate of data used in the transmission system for transmission of the digital images.

16. A communication system as claimed in claim 1, wherein said server includes a control unit for controlling resolution of digital images in said at least one telephone unit and controlling a transmission rate of data used in the transmission system for transmission of the digital images.

17. A method for recording and administering digital images, comprising the steps of:

recording images using a digital pick up unit in a telephone unit, storing the images recorded by the digital pick up unit in a digital form as digital images, transmitting data including at least the digital images and classification information to a server, wherein said classification information is prescribable by a user of the telephone unit for allocation to the digital images, receiving the data by the server, extracting classification information which characterizes the digital images from the received data, and storing the digital images in the server, said step of storing taking into consideration the classification information.

18. A method as claimed in claim 17, further comprising:

recognizing speech spoken into the telephone unit and storing the compressed recognized speech.

19. A method as claimed in claim 17, further comprising the step of:

incorporating audio data as the classification information.

20. A method as claimed in claim 19, wherein the audio data includes language spoken into the telephone unit.

21. A method as claimed in claim 17, further comprising the step of:

providing time information of recording of the image and/or transmission of the data as a part of the classification information.

22. A method as claimed in claim 17, further comprising the step of:

providing a telephone number of the at least one telephone unit and/or of the server as a part of the classification information.

23. A method as claimed in claim 17, further comprising the step of:

providing location information in memory at which the digital images to be stored as a part of the classification information.

24. A method as claimed in claim 17, further comprising the step of:

providing digital character information as part of the classification information.

25. A digital image recording and administering apparatus, comprising:

a portable telephone unit, including:

a telephone portion having a keypad, a microphone, a speaker, an antenna, and a transmitter/receiver for telephone communications;

a digital still camera in said portable telephone unit, said digital still camera having a lens, a shutter and a digital still image pickup;

a data processor connected to receive digital still image data from said digital still image pickup and perform a compression to generate compressed digital still image data;

a memory in said portable telephone unit, said memory connected to receive and store said compressed digital still image data from said data processor;

a classification information unit in said portable telephone unit, said classification information unit allocating classifying information pertaining to the digital still image as prescribed by a user of the portable telephone unit to the digital still image data, said classification information unit including means to receive audio information from the user as the classification information and to allocate the classification information to the corresponding digital still image data;

a server computer, including:
    a receiving unit operable to receive data sent from said portable telephone unit, said received data including the compressed digital still image data;
    an analysis unit connected to said receiving unit to extract the classification information from data sent from said portable telephone unit, said analysis unit extracting the classification information corresponding to the audio information from the user and allocated to the digital still image data;
    a memory in said server for storing the compressed digital still image data, said memory providing access to said compress digital still image data as an image archive in accordance with the classification information; and
    a transmission system operable to communicate between said portable telephone unit and server.

26. A digital image recording and administering apparatus as claimed in claim 25, wherein said classification information unit in said portable telephone unit includes a speech recognition unit which converts said audio information from said user to text data that is allocated to the digital still image data.

* * * * *